United States Patent [19]
Baxter

[11] 3,863,428
[45] Feb. 4, 1975

[54] BLOCKAGE MONITOR FOR A COTTON PICKING MACHINE

[76] Inventor: Robert L. Baxter, 6501 Harding Rd. Apt. A-9, Nashville, Tenn. 37205

[22] Filed: Nov. 14, 1973

[21] Appl. No.: 415,511

[52] U.S. Cl.............. 56/10.2, 56/30, 116/70, 302/17, 56/13.3
[51] Int. Cl............................................. A01d 45/18
[58] Field of Search............................ 56/12.8–13.4, 56/28, 30, 33, 34, 35, 10.2; 116/70; 302/17, 21

[56] References Cited
UNITED STATES PATENTS

| | | | |
|---|---|---|---|
| 1,080,541 | 12/1913 | Copeland | 116/70 |
| 2,048,615 | 7/1936 | Myers et al. | 116/70 |
| 2,633,098 | 3/1953 | Ellis | 116/70 |
| 2,905,136 | 9/1959 | Jukes | 116/70 |
| 3,211,127 | 10/1965 | Boelhouwer | 116/70 |
| 3,378,309 | 4/1968 | Copley et al. | 302/17 |
| 3,464,191 | 9/1969 | Copley et al. | 56/13.3 |

*Primary Examiner*—Russell R. Kinsey
*Attorney, Agent, or Firm*—Harrington A. Lackey

[57] ABSTRACT

A monitor system for detecting blockage in a pneumatic duct system of a cotton picking machine, including a pressure sensing device connected to the region of negative pressure within the duct system and adapted to actuate an alarm upon a change in pressure created by a blockage in the duct system.

4 Claims, 3 Drawing Figures

PATENTED FEB 4 1975  3,863,428

BLOCKAGE MONITOR FOR A COTTON PICKING MACHINE

BACKGROUND OF THE INVENTION

This invention relates to a cotton picking machine, and more particularly to a blockage monitor system for a cotton picking machine.

Cotton picking machines of various types are known in the art, including cotton picking machines having a pneumatic duct system for transferring the picked cotton from the picking head to a storage basket or receptacle. In this type of cotton picking machine, a source of forced air, such as a draft fan, is connected to the duct system to discharge air under pressure into the duct system to create a draft for pulling the picked cotton from the picker head through the duct system to the storage receptacle. In order to produce the most effective type of draft, the diameter of the tubular duct must not be too large. Accordingly, blockages have occurred, particularly at the entrance to the tubular duct from the picker head, created by excessive amounts of cotton jamming the entrance to the duct.

In addition to the obvious disadvantages of stopping the flow of cotton from the picker head to the receptacle, a more serious disadvantage is incurred in the overheating or mechanical break-down of the picker head, because of the continuous rotation of the spindles and the doffers and the continued accumulation of cotton in the picker head. The picker head can become rapidly overheated, sometimes igniting the cotton and burning out the mechanical parts of the picker head. Even where fire does not break out, the overloaded rotating spindles and doffers become damaged by the tremendous forces developed between the drive of the spindles and doffers and the rapidly mounting workload created by the accumulating cotton.

Also known in the art are various types of pressure sensors and pressure-sensor-actuated alarms or indicators, some of which have been used in the detection of changes in pressure in fluid conduits. However, it is not believed that any of these detection systems have been employed in a pneumatic duct assembly for detecting blockages in a cotton picking machine.

SUMMARY OF THE INVENTION

It is therefore an object of this invention to provide a pressure sensitive monitoring system for a cotton picking machine of the type having a picker head, a storage receptacle, and forced draft means for moving air through a duct system to convey the picked cotton from the picker head to the receptacle.

In this monitoring system, the discharge outlet from the forced draft means extends into the wall of the tubular duct at a point spaced from the entrance to the duct from the picker head housing, in such a manner that a current of air is forced into the tubular duct in the direction of the storage receptacle. Thus, a venturi effect is created to draw additional air, as well as the picked cotton, from the picker head through the duct toward the receptacle.

The pressure sensing device includes a pneumatic-electrical transducer element which is coupled through a tubular conduit through the wall of the duct to communicate with the region of negative pressure created between the forced draft discharge outlet and the entrance to the tubular duct. Since blockages usually occur as the cotton moves from the larger space within the picker head into the more constricted entrance to the tubular duct, the negative pressure between the entrance and discharge outlet of the forced draft fan becomes even more negative. The reduction in pressure is sensed by the transducer to create a corresponding change in an electrical signal, which in turn is processed in a special electrical comparison circuit to actuate an alarm of any desired type, visible or audible. Preferably, the sensor, alarm and electrical circuitry are located on the cotton picking machine to provide audible or visible indication of the blockage within the cab of the machine to instantly apprise the operator of the machine of the blockage condition.

The tubular conduit coupled to the transducer element might also be tapped into the housing of the picker head to measure the pressure conditions on the upstream side of the blockage instead of the downstream side. In this case, the sensor would measure an increase in pressure, from a negative pressure to a pressure in the range of atmospheric, instead of a further decrease in negative pressure. In either case, a change in pressure is detected to create a change in an electrical signal which is processed to actuate the alarm.

DESCRIPTION OF THE PREFERRED EMBODIMENTS

Figure 1:
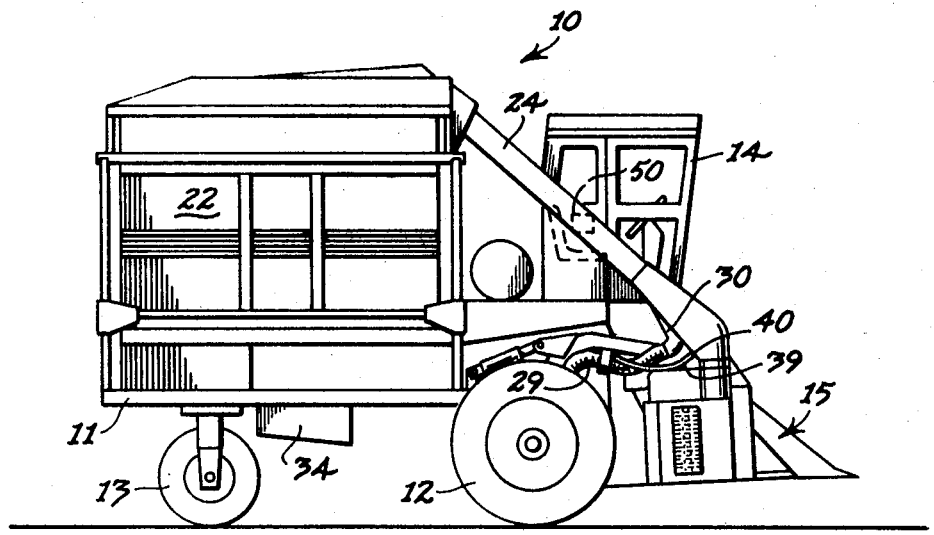
FIG. 1 is a side elevation of a cotton picking machine having a blockage monitoring system made in accordance with this invention.

Referring now more particularly to FIG. 1, a cotton picking machine 10 of a self-propelled type is disclosed having a frame 11 supported upon wheels 12 and 13 and carrying a cab 14 for housing the operator and the controls for driving the machine 10. Mounted on the front of the machine 10 are one or more picker heads 15. Each picker head 15 includes a vertically disposed rotary shaft 16 supporting a plurality of radially extending cotton picking spindles 17, and a parallel, vertical, rotary shaft 18 carrying a plurality of vertically spaced doffers 19 for removing the picked cotton from the spindles 17. The picker head 15 further includes a housing 20 for the spindles 17 and the doffers 19.

Supported upon the rear of the frame 11 is a large storage receptacle or basket 22 for receiving the picked cotton.

A pneumatic duct 24 has an entrance or inlet end 25 opening into the top of the picker head housing 20, and is provided with an open outlet end 26 which opens into the front wall of the storage receptacle 22.

A source of forced air, such as fan 28, has a discharge conduit 29 with a discharge outlet 30 opening through one wall of the duct 24. The direction of the outlet 30 is such that air forced from the fan 28 through the discharge conduit 29 is directed upwardly or toward the outlet end 26 as the air moves into the duct 24, thereby creating a draft or negative pressure within the zone or region 31 between the discharge outlet 30 and the inlet end 25 within the duct 24. It is this negative pressure within zone 31 caused by the venturi effect of the air flow from the discharge outlet 30, which draws the picked cotton from the picker head 15, through the inlet opening 25 up through the duct 24, into the air stream 32 from the fan 28, and ultimately through the outlet end 26 into the storage basket 22.

Engine 34 is disclosed in FIG. 1 mounted on the frame 11 for driving the wheels 12 and 13, the rotary shafts 16 and 18 and the forced draft fan 28, through various conventional transmissions, not shown.

As cotton is being picked from the cotton plant by the spindles 17 and extracted from the spindles 17 by the doffers 19, the picked cotton is sucked upward through the duct 24 into the storage basket 22 by means of the fan 28. Because of the much smaller diameter of the opening through the inlet end 25 of the duct 24, as compared with the space within the housing 15, an excessive amount of picked cotton on occasion does create an obstruction at 35, as disclosed in FIG. 3. If this obstruction 35 continues undetected or unobserved, no additional cotton will pass beyond the obstruction 35 and none will pass through the duct 24 and into the storage basket 22. Accordingly, all of the additional picked cotton will build up rather rapidly within the housing 20, jamming the spindles 17 and doffers 19, so that ultimately various mechanical parts may be either severely mechanically damaged, or burned out because of the overheating of the rotary parts, such as the shafts 16 and 18.

The blockage monitor system 37 made in accordance with this invention includes a pressure sensing device or pressure sensor 38 in the form of a pressure-electrical transducer element adapted to sense fluid pressure, and particularly air pressure, and to convert the sensed mechanical pressures into electrical signals of corresponding values. The pressure sensor 38 is connected through an elongated flexible tube or conduit 39 to a pressure tap or opening 40 within the wall of the duct 24, so that the pressure sensor 38 is in open fluid communication with the interior of the duct 24. The pressure tap 40, in accordance with this invention, must be located within the wall of the duct 24 to freely communicate with the zone or region of negative pressure 31, between the open discharge outlet 30 and the inlet end 25 of the duct 24.

Figure 2:
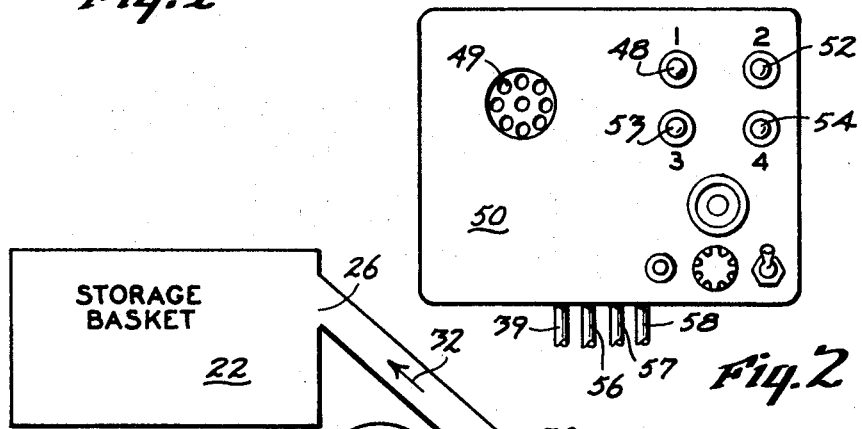
FIG. 2 is an enlarged plan view of the monitor alarm unit.

The monitor system 37 further includes an electrical or electronic comparison circuit 42 adapted to receive electrical signals through line or lead 43 from the transducer element 38. The comparison circuit 42 is also adapted to receive electrical signals through the line or lead 44 from another pressure sensor in the form of a pressure-electrical transducer element 45, which is adapted to sense a reference pressure, such as atmospheric pressure. The comparison circuit 42 may be of any of numerous types of conventional electrical circuits adapted to compare signals from a reference sensor 45 with electrical signals from the pressure sensor 38, to detect the differences in the signals, and to process the differential signal to produce an output signal which is transmitted through the output line or lead 46 to energize an electrical alarm 47. The alarm 47 may include a visual indicator such as an electrical lamp 48 (FIGS. 2 and 3) and/or it may include an audible alarm such as a horn having loudspeaker 49. (FIG. 2).

The pressure sensors 38 and 45, the lines 43 and 44, the comparison circuit 42, output line 46 and alarm 47 may be included in a single unit or box 50, which is preferably mounted within the cab 14, as disclosed in FIG. 1.

In the operation of the monitor system 37, when the blockage 35 occurs, as previously described, in the inlet 25 of the duct 24, the negative pressure within the region 31 becomes even more negative, because the air stream 32 continues to issue from the forced draft fan 28 downstream from discharge opening 30, thereby continuing to create suction within the region 31. However, since the cotton blockage 35 seals off the inlet 25, no further air can enter the region 31 from the inlet 25, and therefore, the pressure within the zone 31 decreases, or becomes more negative. This reduced pressure is transmitted through the conduit 39 to the pressure sensor 38 where the pressure is detected and converted to an electrical signal which is immediately transmitted through the input lead 43 to be processed within the comparison circuit 42. Thus, the change in the differential pressure sensed by the sensors 38 and 45 produces an output signal transmitted through the line 46 to energize the alarm 47. Accordingly, whenever a blockage 35 is formed or in the process of forming, its existence will be immediately known to the operator within the cab 14, who can observe the illuminating light 48 or hear the audible signal through the horn loudspeaker 49. The operator then takes whatever steps are necessary to correct the situation and eliminate the blockage 35.

Since most cotton picking machines 10 have more than one picker head 15, this invention contemplates that the system 37 can monitor each picker head 15. In a machine 10, where there are usually four picker heads, four indicator lights 48, 52, 53 and 54 on the box 50 disclosed in FIG. 2 monitor the four picker heads 15. FIG. 2 also discloses four flexible conduits 39, 56, 57 and 58, each conduit being adapted to be tapped into a different duct assembly for each of the four picker heads.

The system 37 can also be adapted to have its pressure tap 40 connected into the wall of the housing 20 downstream of the blockage 35. The comparison circuit 42 will then be set up to detect an increase in pressure when a blockage 35 occurs instead of a decrease in pressure. After the blockage 35 is formed, the reduced pressure within the housing 20 is eliminated by the atmospheric air rushing into the housing 20, since the housing 20 is cut off from the negative pressure within the one 31 by the blockage 35.

Figure 3:
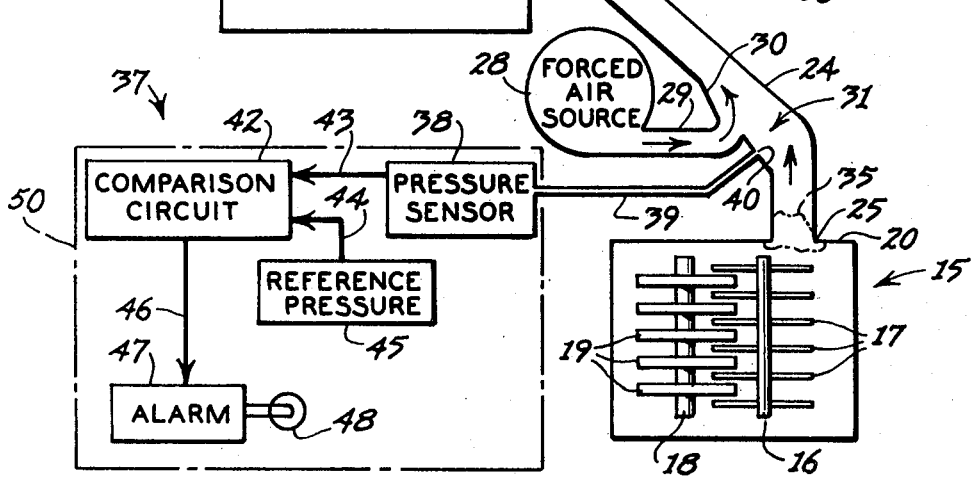
FIG. 3 is a schematic view of the blockage monitor system and the cotton picking machine disclosed in FIG. 1.

It will be understood that all electrical and transducer elements illustrated in block form in FIG. 3 are conventional, or are types known to those skilled in the art. Consequently, the details of the circuits have not been illustrated.

What is claimed is:

1. In a cotton picking machine having a picker head for picking cotton from a cotton plant, a storage receptacle for receiving picked cotton, a pneumatic duct assembly including an enlarged housing for said picker head and an elongated tubular duct of smaller cross-section than said housing, said tubular duct having an open inlet end in fluid communication with said housing and an open outlet end in fluid communication with said receptacle, and forced draft means for moving air through said duct assembly toward said receptacle with sufficient pressure to draw picked cotton from said picker head through said duct assembly to said receptacle, a blockage monitor system comprising:

a. a pressure-electrical transducer element mounted on said machine, b. a tubular conduit connecting said transducer element to said duct assembly to place said transducer element in fluid communication with a region of negative pressure within said duct assembly when said draft means is moving air through said duct assembly, c. an electrically actuated alarm on said machine, d. electrical circuit means on said machine connecting said transducer to said alarm, e. said circuit means being responsive to an electrical signal from said transducer element corresponding to a predetermined change in pressure within said duct assembly to actuate said alarm.

2. The invention according to claim 1 in which said forced draft means has a discharge outlet opening into said tubular duct in a location spaced between said inlet and outlet ends and adapted to direct forced air from said forced draft means through said discharge outlet and into said tubular duct in the direction of said outlet end, said tubular conduit being connected to said duct assembly upstream from said discharge opening.

3. The invention according to claim 2 in which said tubular conduit is connected to said tubular duct between said discharge opening and said inlet end.

4. The invention according to claim 1 in which said electrical circuit means comprises an electrical comparison circuit including means for sensing a reference pressure signal and means for comparing said reference pressure signal with signals from said transducer element.

* * * * *